(12) United States Patent
Dettinger et al.

(10) Patent No.: US 7,805,435 B2
(45) Date of Patent: *Sep. 28, 2010

(54) TRANSFORMATION OF A PHYSICAL QUERY INTO AN ABSTRACT QUERY

(75) Inventors: Richard D. Dettinger, Rochester, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 396 days.

This patent is subject to a terminal disclaimer.

(21) Appl. No.: 12/033,772

(22) Filed: Feb. 19, 2008

(65) Prior Publication Data

US 2008/0147628 A1    Jun. 19, 2008

Related U.S. Application Data

(63) Continuation of application No. 11/016,201, filed on Dec. 17, 2004, now Pat. No. 7,333,981.

(51) Int. Cl.
*G06F 17/00* (2006.01)

(52) U.S. Cl. ............... 707/713; 707/722; 707/736; 707/758; 707/781; 707/791

(58) Field of Classification Search .......... 707/600–831
See application file for complete search history.

(56) References Cited

U.S. PATENT DOCUMENTS

| | | | |
|---|---|---|---|
| 5,404,510 A | 4/1995 | Smith et al. | |
| 5,418,950 A | 5/1995 | Li et al. | |
| 5,471,611 A | 11/1995 | McGregor | |
| 5,515,488 A | 5/1996 | Hoppe et al. | |
| 5,734,887 A | 3/1998 | Kingberg et al. | |
| 5,999,933 A | 12/1999 | Mehta | |
| 6,003,034 A | 12/1999 | Tuli | |
| 6,397,223 B1 | 5/2002 | Kori | |
| 6,442,543 B1 | 8/2002 | Snodgrass et al. | |
| 6,553,368 B2 | 4/2003 | Martin et al. | |
| 6,578,027 B2 | 6/2003 | Cambot et al. | |
| 6,643,633 B2 | 11/2003 | Chau et al. | |
| 6,725,227 B1 | 4/2004 | Li | |
| 6,928,431 B2 | 8/2005 | Dettinger et al. | |
| 6,954,748 B2 | 10/2005 | Dettinger et al. | |
| 6,996,558 B2 | 2/2006 | Dettinger et al. | |
| 7,024,425 B2 | 4/2006 | Krishnaprasad et al. | |
| 7,054,877 B2 | 5/2006 | Dettinger et al. | |
| 7,096,217 B2 | 8/2006 | Dettinger et al. | |

(Continued)

*Primary Examiner*—Isaac M Woo
(74) *Attorney, Agent, or Firm*—Patterson & Sheridan, LLP

(57) ABSTRACT

Embodiments of the invention provide methods, systems, and articles of manufacture for transforming a physical query (e.g., written in SQL) into an abstract query than can be run against an abstract database described by a database abstraction model. In one embodiment, the transformation occurs as a multiple step process: first, transformation of the physical query into an intermediate representation, such as an abstract query plan, and second, transformation of the intermediate representation into an abstract query. There are thousands upon thousands of existing physical (e.g., SQL) queries. Rather than just abandon these existing queries in favor of an abstract database, embodiments of the present invention provide for reverse query processing, that is, for creating an abstract query of the abstract database from a physical query (e.g., an SQL query) of the physical database underlying the abstraction.

20 Claims, 9 Drawing Sheets

U.S. PATENT DOCUMENTS

| | | |
|---|---|---|
| 7,096,229 B2 | 8/2006 | Dettinger et al. |
| 7,139,774 B2 | 11/2006 | Dettinger et al. |
| 7,146,376 B2 | 12/2006 | Dettinger et al. |
| 7,213,017 B2 | 5/2007 | Rys et al. |
| 2004/0158567 A1 | 8/2004 | Dettinger et al. |
| 2004/0260685 A1 | 12/2004 | Pfleiger et al. |
| 2004/0260691 A1 | 12/2004 | Desai et al. |
| 2004/0267760 A1 | 12/2004 | Brundage et al. |
| 2005/0076015 A1 | 4/2005 | Dettinger et al. |
| 2006/0047638 A1 | 3/2006 | Dettinger et al. |
| 2006/0122993 A1 | 6/2006 | Dettinger et al. |
| 2006/0136382 A1 | 6/2006 | Dettinger et al. |
| 2006/0136469 A1 | 6/2006 | Dettinger et al. |
| 2006/0136470 A1 | 6/2006 | Dettinger et al. |

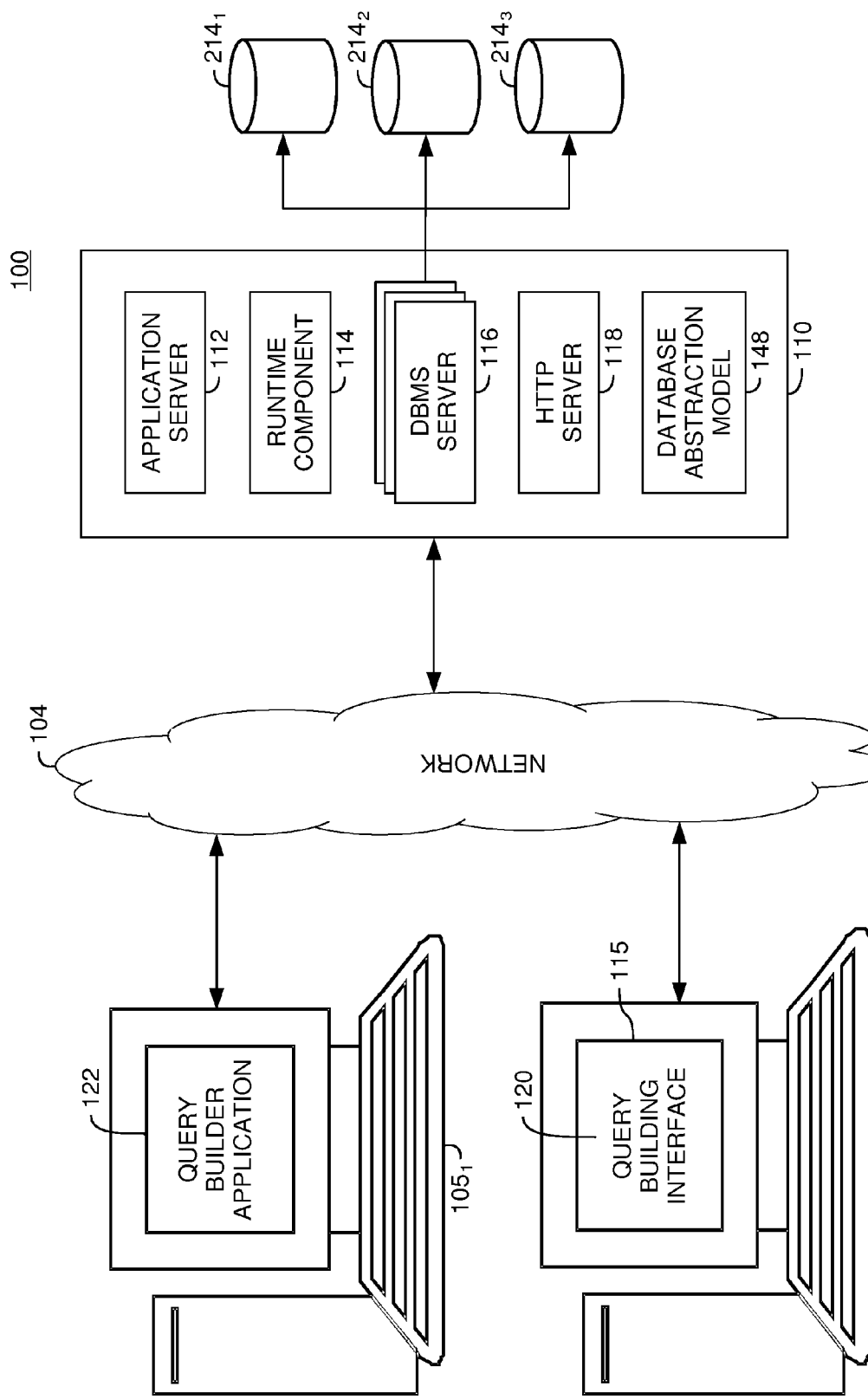

TRANSFORMATION OF A PHYSICAL QUERY INTO AN ABSTRACT QUERY

CROSS-REFERENCE TO RELATED APPLICATIONS

This application is a continuation of U.S. patent application Ser. No. 11/016,201, filed Dec. 17, 2004 now U.S. Pat. No. 7,333,981, which is herein incorporated by reference in its entirety.

BACKGROUND OF THE INVENTION

1. Field of the Invention

The present invention generally relates to query processing. More specifically, this application relates techniques for creating an abstract query from a physical query of a database.

2. Description of the Related Art

Databases are well known systems for information storage and retrieval. The most prevalent type of database used today is the relational database that stores data in a set of tables that may be reorganized and accessed in a number of different ways. A relational database management system (DBMS) uses relational techniques for storing and retrieving data.

Structured Query Language (SQL) is a well known database language that that includes commands for retrieving, storing, updating, and deleting data stored in a relational database. An SQL query is constructed as a text string that must strictly conform to the grammar requirements of the SQL query language. Further, an SQL query must be semantically correct to perform as desired by the user. That is, many syntactically correct SQL statements may fail to perform as desired due to semantic errors. Because of this complexity, database query applications are often used to assist a user in composing an SQL query of a relational database.

For example, one technique for managing the complexity of a relational database and the SQL query language is to use database abstraction techniques. Commonly assigned U.S. patent application Ser. No. 10/083,075 (the '075 application) entitled "Application Portability and Extensibility through Database Schema and Query Abstraction", discloses a framework that provides an abstract view of a physical data storage mechanism. The framework of the '075 application provides a requesting entity (i.e., an end-user or front-end application) with an abstract representation of data stored in an underlying physical storage mechanism, such as a relational database.

Using the database abstraction model, logical fields are defined that describe data stored in an underlying database. Users compose abstract queries by selecting logical fields and specifying conditions. In one embodiment of a database abstraction model, each logical field specifies an access method that specifies how to retrieve data from an underlying database system corresponding to the logical field. The system then retrieves data from the underlying database by generating a resolved query from the abstract query.

Abstract database technology offers functionality impossible in current relational databases. Moreover, abstract databases allow users to keep data in the existing database in its current format while allowing users to create more interesting queries with less effort. Many entities have, however, made substantial investments in creating queries to run against their relational databases. Oftentimes carefully crafted queries are saved, stored, shared and reused. Further existing queries may be hard coded as part of query applications, forms, and the like.

Accordingly, there exists a need for techniques to transform a query written in the query language for an underlying physical database, SQL in many cases, into an abstract query that can be executed against the abstract database. Doing so captures the effort of creating the physical query while allowing access to the more feature rich abstract database environment, and lowers entry barriers to deploying an abstract database.

SUMMARY OF THE INVENTION

Embodiments of the invention provide methods, systems, and articles of manufacture for transforming a physical query (e.g., written in SQL) into an abstract query than can be run against an abstract database described by a database abstraction model. In one embodiment, the transformation occurs as a two step process: first, transformation of the physical query into an intermediate representation, such as an abstract query plan, and second, transformation of the intermediate representation into an abstract query. Both processes are described below.

One embodiment of the invention provides a method of generating an abstract query from a physical query. The method generally comprises, receiving, from a requesting entity, a physical query composed in a query language used to query a physical database, generating, from the physical query, an intermediate representation of the physical query that indicates (i) data sources within the physical database containing data queried by the physical query, (ii) conditions specified by the physical query on the data queried and (iii) the relationships between the data sources queried by the physical query, and generating, from the intermediate representation, an abstract query composed from a plurality of logical fields, wherein each logical field specifies (i) a name used to identify the logical field, and (ii) an access method that maps the logical field to data in the physical database.

Another embodiment of the invention, provides a computer-readable medium containing a program which, when executed by a computer system, performs operations. The operations generally include receiving, from a requesting entity, a physical query composed in a query language used to query a physical database, generating, from the physical query, an intermediate representation of the physical query that indicates (i) data sources within the physical database containing data queried by the physical query, (ii) any conditions specified by the physical query on the data queried and (iii) the relationships between the data sources queried by the physical query; and generating, from the intermediate representation, an abstract query composed from a plurality of logical fields, wherein each logical field specifies (i) a name used to identify the logical field, and (ii) an access method that maps the logical field to data in the physical database.

Another embodiment of the invention provides a system for processing a database query. The system generally includes, a database abstraction model that provides a set of logical fields used to compose an abstract query, wherein each logical field specifies (i) an access method that maps the logical field to data in an underlying physical database. The system generally further includes a runtime component configured to receive a physical query, and in response to generate, from the physical query, an intermediate representation of the physical query that indicates (i) data sources within the physical database containing data queried by the physical query, (ii) conditions specified by the physical query on the data queried and (iii) the relationships between the data sources queried by the physical query, and further configured to generate, from the intermediate representation, an abstract query composed from a plurality of logical fields, wherein each logical field specifies (i) a name used to identify the logical field, and (ii) an access method that maps the logical field to data in the physical database.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

Note, however, that the appended drawings illustrate only typical embodiments of this invention and are therefore not to be considered limiting of its scope, for the invention may admit to other equally effective embodiments.

FIG. 1 illustrates a relational view of software and hardware components, according to one embodiment of the invention.

DETAILED DESCRIPTION OF THE PREFERRED EMBODIMENTS

Figure 2A:
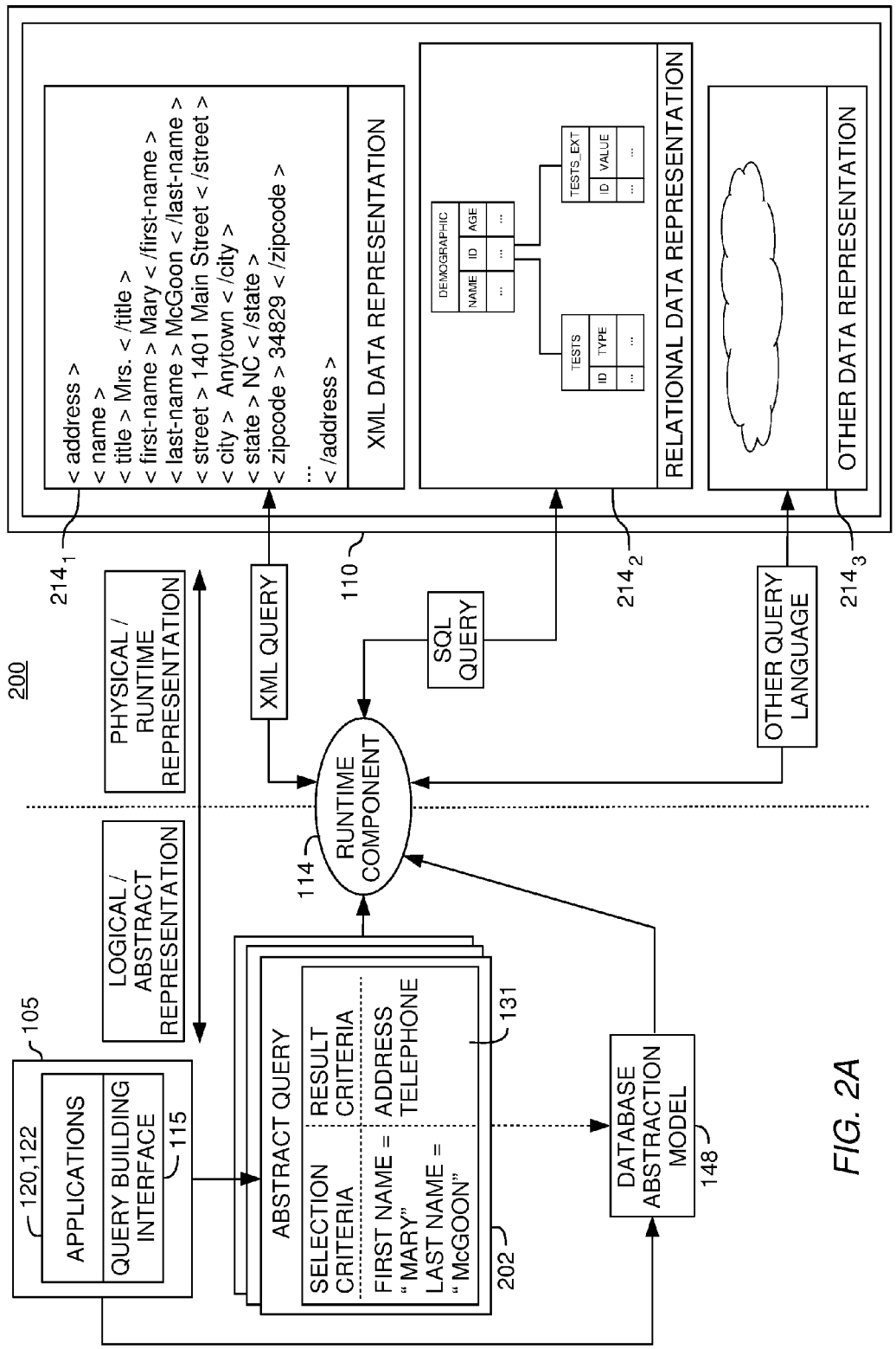
FIG. 2A illustrates a relational view of software components, according to one embodiment of the invention.

Embodiments of the present invention provide methods, systems, and articles of manufacture used to create an abstract query from a physical query of a database system. Generally, once a database abstraction model is constructed, existing physical queries may be used to generate a corresponding abstract query. In one embodiment, the physical query is used to generate an intermediate representation of the query, such as an abstract query plan. An abstract query plan includes a combination of elements taken from the database abstraction model and from the physical underlying representation.

In one embodiment, creating an abstract query from an SQL query includes the following steps: (i) resolve all common table expressions, views, and temporary tables, (ii) divide the SQL query into regions, (iii) create an abstract query plan fragment for each region, and (iv) join each of the fragments together. From the abstract query plan, matches between columns referenced by logical fields and columns referenced in the physical query are used to select logical fields to include in an abstract query.

In the following description, reference is made to embodiments of the invention. The invention is not, however, limited to any specifically described embodiment. Rather, any combination of the following features and elements, whether related to a described embodiment or not, implements and practices the invention. Furthermore, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative and are not considered elements or limitations of the appended claims except where explicitly recited in a claim. Similarly, references to "the invention" shall neither be construed as a generalization of any inventive subject matter disclosed herein nor considered an element or limitation of the appended claims except where explicitly recited in a claim.

One embodiment of the invention is implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other computer networks. Such signal-bearing media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, the functionality of programs described herein using discrete modules or components interacting with one another. Those skilled in the art recognize, however, that different embodiments may combine or merge such components and modules in many different ways.

The following description first describes the database abstraction model environment. After setting up this environment, methods for creating abstract queries from a physical query of a database system covered by the database abstraction model are described.

The Database Abstraction Model: Physical View of the Environment

FIG. 1 illustrates a networked computer system in a client-server configuration in which a database abstraction model may be implemented. Client computer systems $105_{1-N}$ include a network interface allowing them to communicate with other systems over network 104. The network 104 may comprise a local area network wherein both the client system 105 and server system 110 reside in the same general location, or may comprise network connections between geographically distributed systems, including network connections over the Internet. Client system 105 generally includes a central processing unit (CPU) connected via a bus, to memory and storage (not shown). Client system 105 is running an operating system, (e.g., a Linux® distribution, Microsoft Windows®, IBM's AIX®, FreeBSD, and the like) that manages the interaction between hardware components and higher-level software applications running on client system 105.

In one embodiment, a user establishes a network connection between client system 105 and server system 110. Such a connection may include a login process wherein a user authenticates the user's identity to the server system 110 using, for example, a username and password or other authentication schemes (e.g., digital certificates or biometric authentication). Systems that do not require authentication are also contemplated. The server system 110 may include computer hardware components similar to those used by client system 105. Accordingly, the server system 110 generally includes a CPU, a memory, and a storage device connected to a bus (not shown). The server system 110 is also running an operating system, (e.g., a Linux® distribution, Microsoft Windows®, IBM's AIX® or OS/400®, FreeBSD, and the like) that manages the interaction between hardware components and software applications.

The computer systems illustrated in FIG. 1, however, are merely exemplary of one hardware/software configuration. Embodiments of the present invention may be implemented using other configurations, regardless of whether the computer systems are complex, multi-user computing systems, such as a cluster of individual computers connected by a high-speed network, single-user workstations, or network appliances lacking non-volatile storage of their own. Additionally, although described herein using a client/server network configuration, embodiments employing distributed computing or peer-to-peer processing techniques are contemplated.

In one embodiment, users interact with the server system 110 using a graphical user interface (GUI). In a particular embodiment, GUI content may comprise HTML documents (i.e., web-pages) rendered on a client computer system $105_1$ using web-browser 122. In such an embodiment, the server system 110 includes a Hypertext Transfer Protocol (http) server 118 (e.g., a web server such as the open source Apache web-sever program or IBM's Web Sphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests from client system 105. The web-pages may include pages that present a query-building interface 115 to a user interacting with the system 110.

Alternatively, or in addition, client application 120 may provide a database front-end application program running on client system $105_N$. In either case, the query building interface 115 allows users to compose an abstract query. The database abstraction model 148 defines the logical fields available for query composition. Once completed, the abstract query may be submitted to the runtime component 114, which generates a resolved query of the underlying databases 214.

As illustrated in FIG. 1, server system 110 may further include runtime component 114, DBMS server 116, and database abstraction model 148. Each of these components may comprise a software program executing on the server system 110. The DBMS server 116 generally comprises a software application configured to manage databases $214_{1-3}$. By way of illustration, the individual databases accessible through DBMS server 116 may include a relational database $214_2$ queried using an SQL query, or an XML database $214_1$ queried using an XML query. The invention, however, is not limited to any particular physical database storage mechanism and may readily be extended to operate on other such mechanisms, whether currently known or unknown. Accordingly, data storage mechanism $214_3$ illustrates other storage mechanisms managed by a DBMS server 116. Further, databases 214 may exist on the local storage system of server system 110, or may be accessed over network 104.

In one embodiment, a user composes an abstract query using logical fields defined by a database abstraction model 148. An abstract query may include a model entity being queried, a selection of logical fields, and conditions applied against the fields. The model entity provides a focus for an abstract query, e.g., a person, an object, a test, etc. The database abstraction model 148 relates a model entity to an identifier in the underlying database. For example, a patient model entity may be defined by instances of a patient ID value stored in a column form an underlying relational table. The database abstraction model 148 defines the relationship between each logical field and data from an underlying physical database. In one embodiment, each logical field defined by the database abstraction model 148 includes a name and an access method. The access method identifies the underlying database (e.g., databases $214_{1-3}$) where the data is located, as well as the method to access the data in the underlying physical storage mechanism.

Runtime component 114 is configured to generate a query consistent with the physical representation of the data contained in one or more of the databases 214. In other words, the runtime component is the "transformational engine" used to generate the physical query (e.g., an SQL statement) from an abstract query. The runtime component 114 takes an abstract query composed by a user, identifies the information corresponding to each logical field included in the query from the database abstraction model 148, and generates a physical query run by DBMS 116 against the underlying physical storage mechanism. In one embodiment, the runtime component 114 receives an abstract query, generates an intermediate representation of the abstract query, and then uses the intermediate representation to generate a resolved query. In one embodiment, the intermediate representation may be an abstract query plan. Detailed examples of an abstract query plans are described in commonly assigned U.S. patent application entitled "Abstract Query Plan," incorporated by reference in its entirety. Additionally, the runtime component 114 may be configured to return query results to the requesting entity as a set of instances of an abstract record.

FIG. 2A illustrates a plurality of related hardware and software components, along with the transformation between the abstract view provided by the database abstraction model 148 (the left side of FIG. 2A), and the underlying database mechanism 214 used to store data (the right side of FIG. 2A).

In one embodiment, a requesting entity composes an abstract query 202 using query building interface 115. The query building interface may be provided by the application 120, or may be a web-page rendered on web browser 122. The resulting query is generally referred to herein as an "abstract query" because it is composed from logical fields rather than by direct references to data entities in underlying databases $214_{1-3}$. As a result, abstract queries may be composed independently from the particular underlying relational database schema.

In one embodiment, the logical fields used to compose the abstract query 202 are defined by the database abstraction model 148. In general, the database abstraction model 148 constructs an abstract representation of the underlying database. The runtime component 114 is the connection between the abstract representation provided by the database abstraction model 148 and the underlying physical database. For example, the runtime component 114 may transform abstract query 202 into an XML query that queries data from database $214_1$, an SQL query of relational database $214_2$, or other query composed according to another physical storage mechanism (whether currently known or later developed).

The Database Abstraction Model: Logical View of the Environment

Figure 2B:
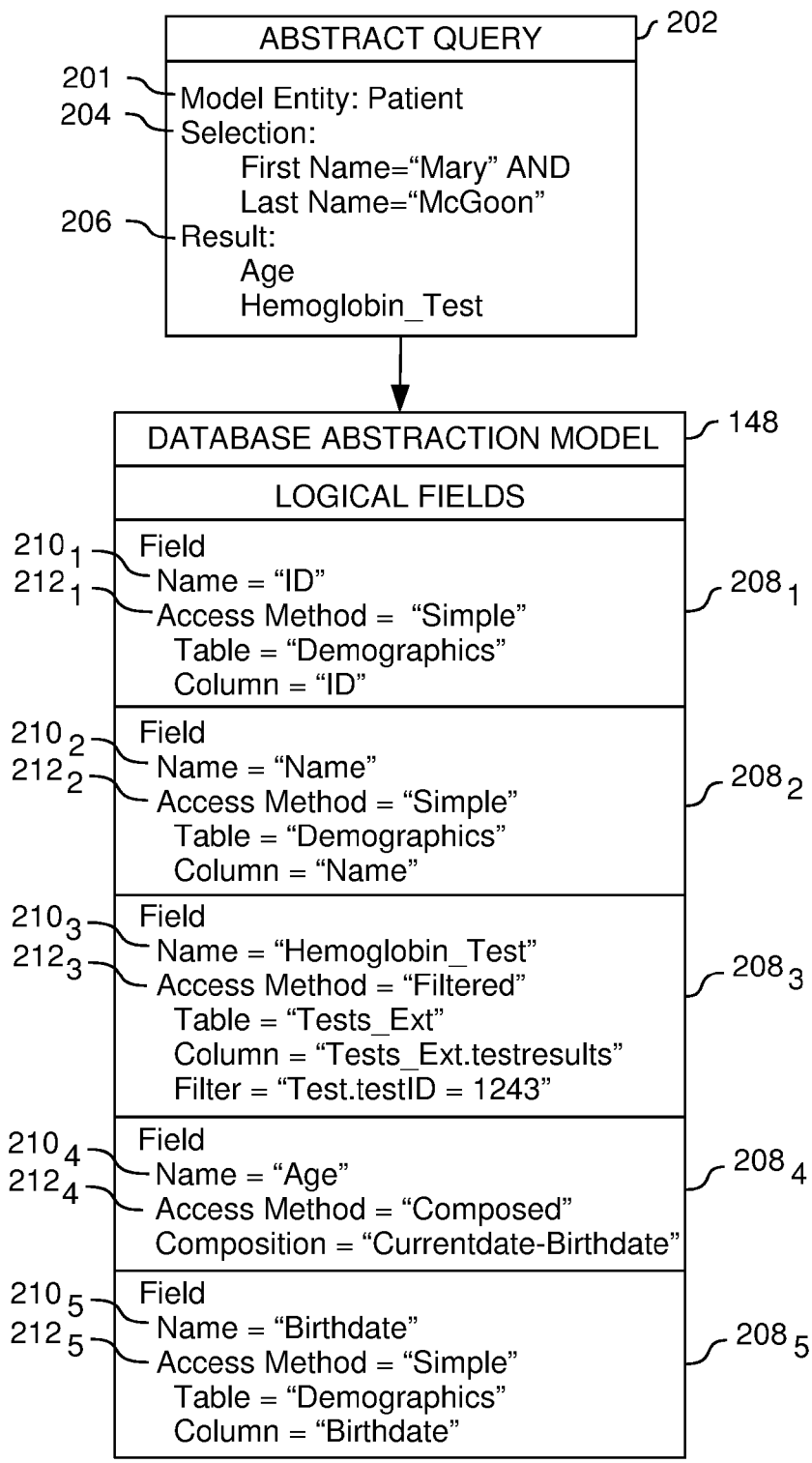
FIG. 2B illustrates an abstract query and corresponding data repository abstraction component, according to one embodiment of the invention.

FIG. 2B illustrates an exemplary abstract query 202. The query includes selection criteria 204 designed to retrieve information about a patient named "Mary McGoon." The particular information retrieved is specified by result criteria 206. In this case, the query retrieves an age and test results for a hemoglobin test. The actual data retrieved may include data from for multiple tests. That is, the query results may exhibit a one-to-many relationship between the named patient and the test results for the patient. In addition, abstract query 202 specifies a model entity 201, as illustrated, a "patient" model entity.

Users select the logical fields to compose an abstract query by interacting query interface 115. Additionally, users may specify query conditions as part of generating an abstract query. In one embodiment, a selection criterion consists of a field name (for a logical field), a comparison operator (=, >, <, etc) and a value expression (what is the field being compared to). In one embodiment, the result specification is a list of logical fields from which data is retrieved as query results. The actual data returned is consistent with the selection criteria. The model entity for the query is also specified as part of query composition.

As described above, in one embodiment, a user specifies what model entity is being queried as part of the query building process. What model entites are available is defined by the framework of the data abstraction model 148. In one embodiment, the data abstraction model 148 includes metadata that relates a model entity to an identifier in the underlying database. Detailed examples of model entities are described in further detail in a commonly owned, pending application entitled "Dealing with Composite Data through Data Model Entities," application Ser. No. 10/403,356 filed Mar. 31, 2003, which is incorporated by reference herein in its entirety.

FIG. 2B further illustrates one embodiment of a data abstraction model 148 that specifies a plurality of logical field specifications $208_{1-5}$ (five shown by way of example. Collectively, logical field specifications 208 create an abstraction over an underlying physical database and corresponding database schema. Those skilled in the art will recognize that multiple data repository abstraction models may be constructed over the same set of underlying physical storage mechanisms. Accordingly, abstractions may be constructed to expose different portions of a database to different users, or abstractions constructed over the same data may differ, and may be customized to the needs of a particular user (or group of users).

The logical fields shown in FIG. 2B illustrate an abstraction constructed over a relational database. The access methods included in field specifications 208 define a mapping between the logical field and tables and columns from a relational database (e.g., database $214_2$ from FIG. 2A). The data abstraction model 148 provides a logical field specification 208 each logical field available for composition of an abstract query (e.g., abstract query 202). The logical field specification 208 stores a definition for each logical field, and any associated metadata. As illustrated, each field specification 208 identifies a logical field name $210_{1-5}$ and an associated access method $212_{1-5}$. The runtime component 114 uses the access method to map a logical field to a particular physical data storage mechanism 214. Depending upon the number of different types of logical fields, any number of access methods is contemplated. As illustrated in FIG. 2B, access methods for simple fields, filtered fields, and composed fields are provided.

Field specifications $208_1$, $208_2$ and $208_5$ each provide a simple access method $212_1$, $212_2$, and $212_5$. The simple access method provides a direct mapping to a particular entity in the underlying physical data representation. When this is a relational database, the simple access method maps the logical field to an identified database table and column. For example, the simple field access method $212_2$ shown in FIG. 2B maps the logical field name $210_2$ ("Name") to a column named "name" in a table named "Demographics." The logical field specification 208 may also include metadata indicating how the logical field is related to other entities in the data abstraction model 148.

Field specification $208_3$ exemplifies a filtered field access method $212_3$. Filtered access methods identify an associated physical entity and provide rules used to define a particular subset of items within the physical data representation. Consider, for example, a relational table storing test results for a plurality of different medical tests. Logical fields corresponding to each different test may be defined, and the filter for each different test is used to identify what particular test is associated with a logical field. An example is provided in FIG. 2B in which the access method for filtered field $212_3$ maps the logical field name $210_3$ ("Hemoglobin Test") to a physical entity in a column named "Test_Result" in a table named "Tests" and defines a filter "Test_ID='1243.' Accordingly, the filtered field acts as selection criteria used to restrict items from a larger set of data, without the user having to know the specifics of how the data is represented in the underlying physical storage mechanisms.

Field specification $208_4$ exemplifies a composed access method $212_4$. Composed access methods generate values from one or more physical data items, or data returned by other logical fields, using an expression supplied as part of the access method definition. In this way, information which does not directly exist in the underlying data representation may be computed and provided to a requesting entity. In the example illustrated in FIG. 2B the composed field access method $212_3$ maps the logical field "Age" to another logical field $208_5$ named "birth date." The logical field "birthdate" $210_5$ maps to a column in the demographics table. The composition expression is used to compute a value for the composed field. In this example, an age value is computed by subtracting the current date from the birth date value returned by the "birth date" logical field.

By way of example, the field specifications 208 of the data repository abstraction component 148 shown in FIG. 2B are representative of logical fields mapped to data represented in the relational data representation $214_2$. However, other instances of the data repository abstraction component 148 or other logical field specifications may map to other physical data representations (e.g., databases $214_1$ or $214_3$ illustrated in FIG. 2A).

Figure 3:
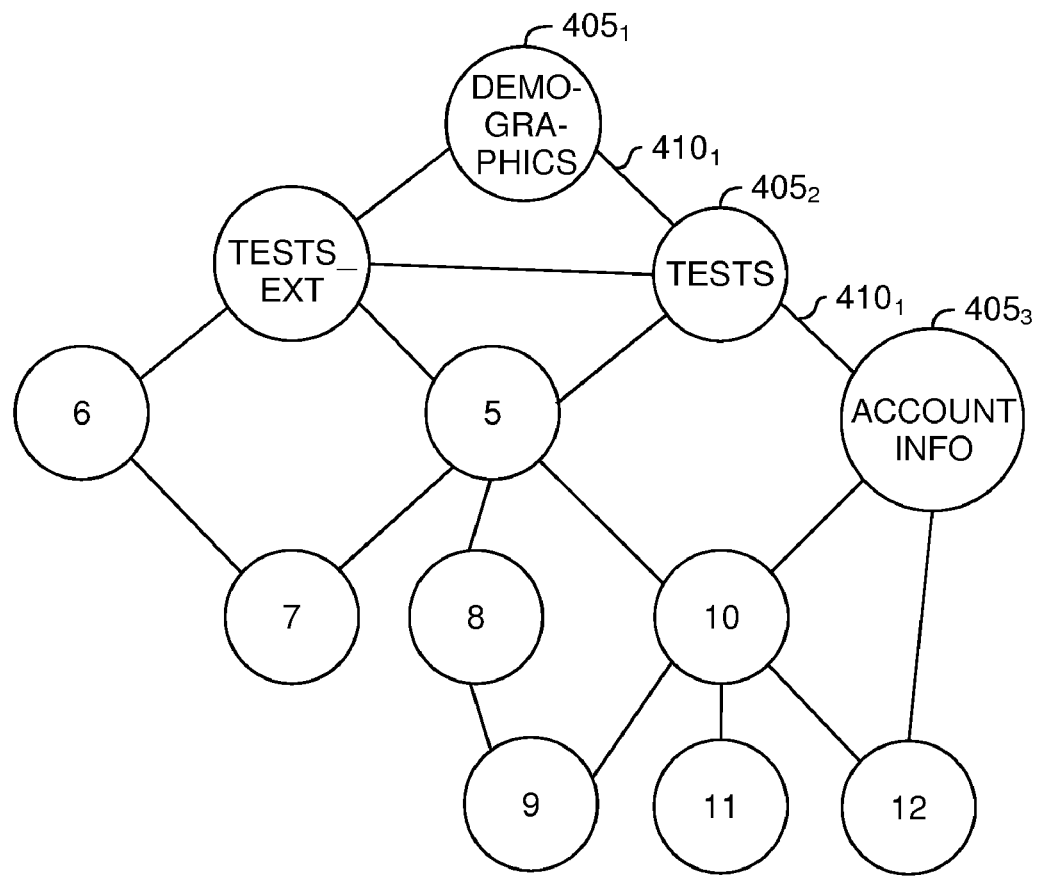
FIG. 3 illustrates a table relations graph that represents the relationships between data sets in an underlying database, according to one embodiment of the invention.

In one embodiment, the database abstraction model 148 includes a table relations graph that identifies the relationships between different data sources (e.g., relational tables). This graph is used, in part, to construct an abstract query plan from an abstract query. In addition, the table relations graph 300 may be used to generate an abstract query plan from a physical query as part of reverse query processing describe below. FIG. 3 illustrates an exemplary table relations graph 300 of an underlying database. Table relations graph 300 specifies the relationships between data sources in the underlying physical storage mechanism. The structure of the table relations graph 300 is derived from the underlying physical database structure being abstracted.

Where the underlying physical storage mechanism is a relational database, the relational schema (i.e. a set of primary and foreign key relationships) may be used to generate the graph representation 300. Each node 305 (three nodes labeled for illustration) of the graph 300 may represent an actual table from the underlying relational schema, or may represent a table defined from one or more actual tables, such as a database view. As illustrated, node 1 and node 2 are connected by edge $310_1$, and node 2 and node 3 are connected through edge $310_2$. Also, node 1 and node 3 are connected, through node 2. Other nodes are similarly connected. Edges 310 represent how data from different nodes may be joined together i.e., the relationships between data located in different nodes. Such relationships may include both one-to-one and one-to-many relationships.

Figure 4:
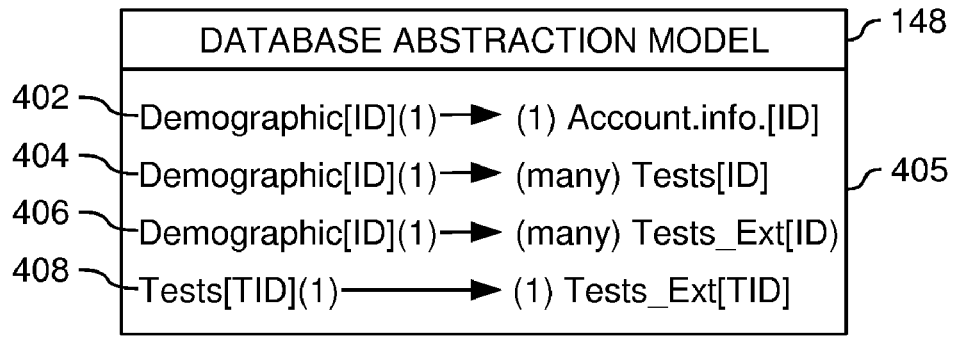
FIG. 4 illustrates a set of relations between data stored in different nodes of the table relations graph illustrated in FIG. 3.

For example, FIG. 4 illustrates an extension to the database abstraction model 148 that includes relationship metadata describing one-to-one and one-to-many relationships present between tables in the underlying database system. Relationships 405 specify that two tables are related, and indicate a column used to relate data between the tables. Also, each relationship 405 specifies the type of relationship e.g., one-to-one or one-to-many. As illustrated, relationships 402, 404, 406, and 408 identify relationships between the demographic, tests, and test_ext tables.

Query Processing: Creating an Abstract Query from a Physical Query

Using the above described physical and logical environment, users interact with query building interface 115 to compose queries of the abstract database. Once composed, an abstract query is submitted to the runtime component 114, and used to generate a query of the underlying physical database. This resolved query is then executed against the underlying database to generate a set of query results. Detailed examples of query processing in the "forward" direction are described in commonly assigned, U.S. patent application entitled "Abstract Query Plan", filed herewith. Embodiments of the present invention allow query processing in the "reverse" direction.

Given the prevalence of the relational database, and of SQL as the standard query language for querying a relational database, there are a myriad of existing SQL queries. As database administrators have maintained existing relational databases, many queries have been finely tuned for both performance and for retrieving specific result sets. Rather than just abandon these existing queries of the underlying database, embodiments of the present invention provide for reverse query processing; that is, for creating an abstract query of the abstract database from a query (e.g., an SQL query) of the physical database underlying the abstraction.

Figure 5:
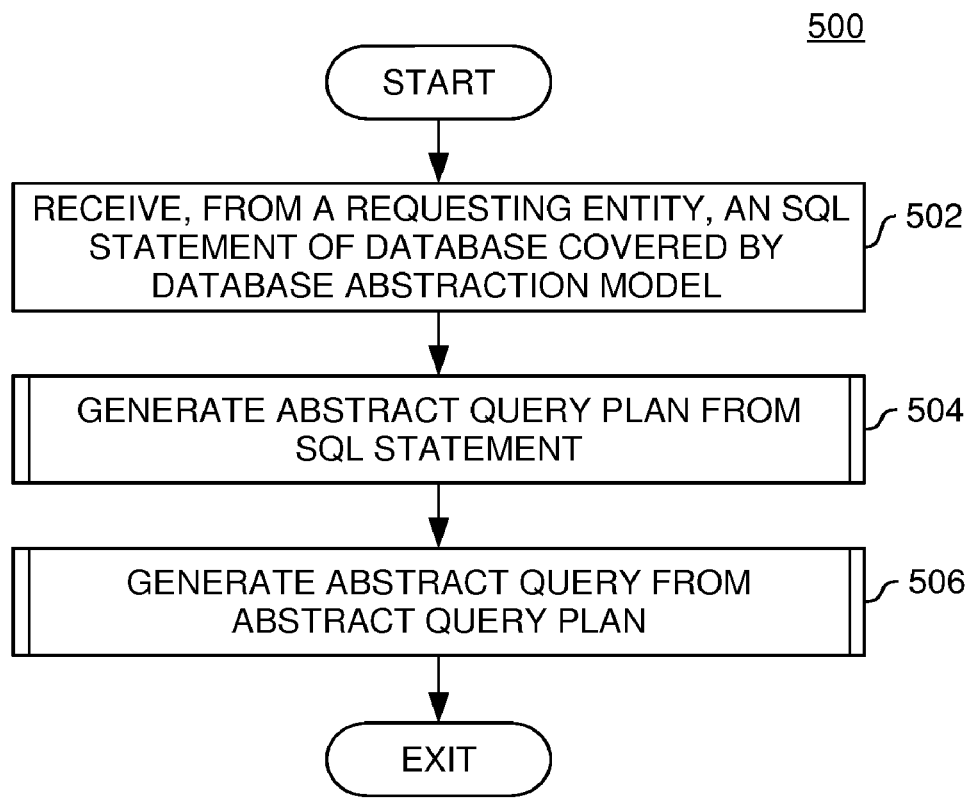
FIG. 5 illustrates a method for generating an abstract query of an abstract database from a physical query, such as an SQL statement, according to one embodiment of the invention.

FIG. 5 illustrates a method 500 for generating an abstract query from a physical query of an underlying database. The method assumes that a database abstraction model constructed like the one described above in reference to FIGS. 1-4 is provided for the underlying relational database. In addition, the following discussion uses a particular SQL query as an example, specifically:

TABLE I

| SQL Query Example - Original |
|---|
| with T1 as (select * from test, test_ext where type=1 and test.testid=test_ext.testid where value = 20) select t2.id, t2.Name, t3.value as Test1 from Demographic t2 left join t1 as t3 on t1.id = t3.id where t2.id = 123 |

Method 500 uses this query, along with the logical fields, table relations graph, and table relationships stored in the database abstraction model 148, to generate a corresponding abstract query.

The method 500 begins at step 502 when the selected physical query is provided to runtime component 114. In one embodiment, the physical query is transmitted across network 104 to system 110 using well-known data communications protocols. Interface 115 may include control objects to initiate reverse query processing for a specified physical query.

At step 504 the runtime component 114 first generates an intermediate representation of the physical query, such as an abstract query plan. Generating an abstract query plan from a physical query is further described below in conjunction with FIG. 6. After generating an abstract query plan from the physical query, the abstract query plan is used to generate an abstract query at step 506. Step 506 is further described below in conjunction with FIG. 9.

Reverse Query Processing: Generating an Abstract Query Plan

Figure 6:
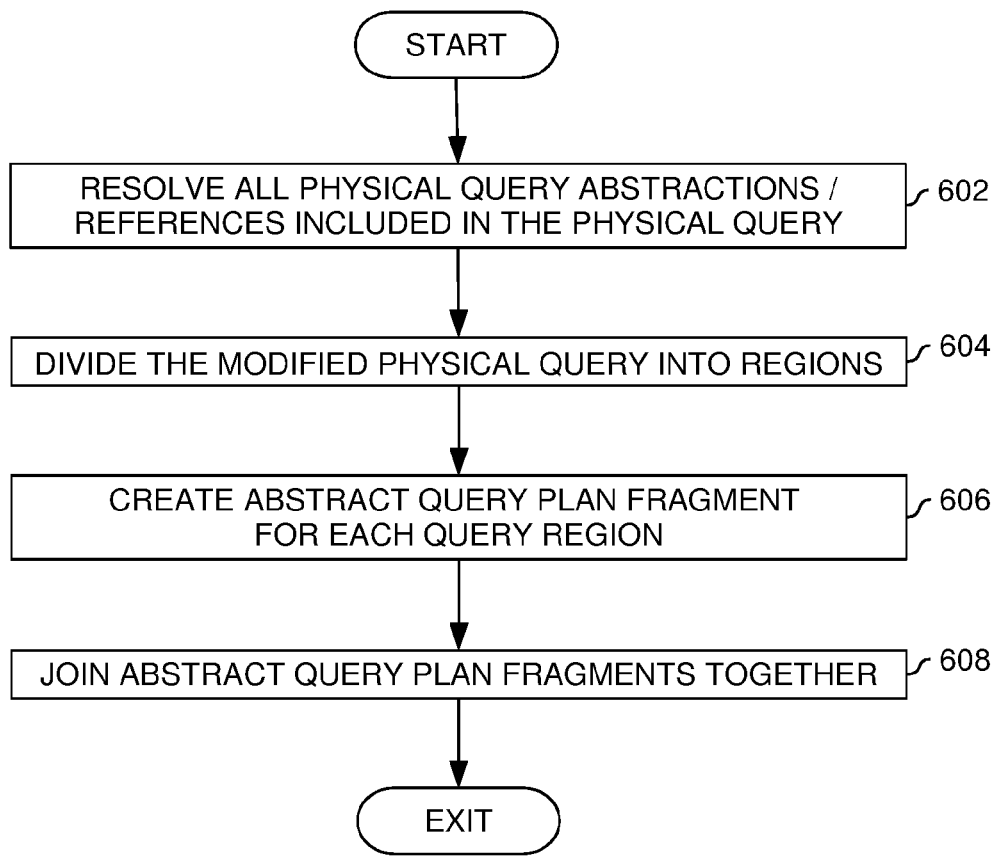
FIG. 6 illustrates a method to create an abstract query plan from a physical query, further illustrating the method of FIG. 5, according to one embodiment of the invention.

FIG. 6 illustrates a method 600 for creating an abstract query plan from a physical query, further illustrating step 504 of method 500, according to one embodiment of the invention. The method begins at step 602 where all physical query abstractions or indirect references are resolved. Generally, an SQL query may refer to several SQL constructs such as a common table expression, view, or temporary table. Each of these SQL constructs is used to refer to an actual table in the underlying database and is used to assist in constructing the SQL query. For example, the example query listed in Table I includes a common table expression labeled "T1," specified by the "with" clause of the query. This common table expression is then referenced by the "select" clause of the SQL query using the "T1" label. To create an abstract query plan, however, the runtime component 114 needs to identify each actual table in the underlying database referenced by the physical query. Accordingly, Table II illustrates the same physical query as Table I, but the common table expression is removed from the SQL query, and replaced with the statement that defined the common table expression.

TABLE II

SQL Query Example - Modified select t2.id, t2.Name, t3.value as Test1 from Demographic t2 left join
(select * from test, test_ext where type=1 and test.testid=test_ext.testid
where value = 20) as t3 on t1.id = t3.id where t2.id = 123

After all table references in the physical query are resolved, each table referenced by the physical query is referenced by a select statement. Views and temporary tables are resolved in much the same way. Each reference to a view or temporary table is replaced with a sub-select statement that generates the view or temporary table.

At step 604, the modified physical query is divided into regions. Often, a useful SQL query will include multiple sub query statements, each having respective "select" statements. Each region of the physical query identified at step 604 corresponds to a "select" query operation included in the physical query. For example, the query in Table II contains two select operations: a primary select and a nested sub query. The sub query was inserted at step 602 when the "T1" common table expression was resolved. Table III, below, illustrates the query example from Table II with two regions marked off using brackets.

TABLE III

SQL Query Example - Modified and Regions Marked

<region1> select t2.id, t2.Name, t3.value as Test1 from Demographic t2 left join
<region 2> (select * from test, test_ext where type=123 and test.testid=test_ext.testid where value = 20) </region2>
as t3 on t1.id = t3.id where t2.id = 123 </region1>

As illustrated, region 2 is nested within region 1. Depending on the number of sub-select statements in a physical query, the regions may be nested to an arbitrary depth.

Next, at step 606, a fragment of an abstract query plan is created for each distinct physical query region identified at step 604. In one embodiment, each fragment is composed from a set of table instances joined together in a tree type hierarchy. Nodes are joined together using a join relationship that specifies how data corresponding to one table instance is related to other table instances in the fragment.

Figure 7:
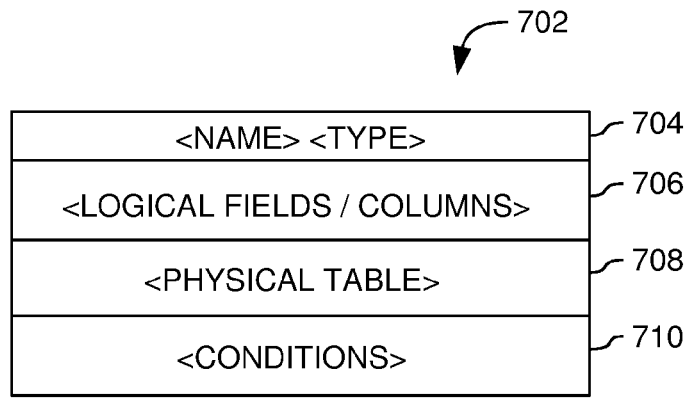
FIG. 7 illustrates a table instance data structure component of an abstract query plan, according to one embodiment of the invention.

Each table instance may comprise a data structure used by runtime component 114 that includes a combination of both logical data from the data abstraction model, and physical data (e.g., tables and columns) from the underlying physical storage mechanism. In one embodiment, each table instance includes a physical table used in a query. Additionally, an SQL query may use multiple copies of the same physical table. FIG. 7 shows an illustration of one embodiment of a table instance 702 data structure. As illustrated, table instance 702 includes columns/fields section 706, table section 708, conditions sections 710. Table section 708 identifies the underlying physical data source (e.g., a relational table) associated with the table instance. Conditions section 710 includes the conditions specified by the abstract query. Table instance 702 includes an identifier 704 used to identify each distinct table instance.

Table III, above, marks two regions for the example query. Accordingly, two abstract query plan fragments are created for the example query as part of step 606. Region 1 is set out below, without the material included in region 2.

select t2.id, t2.Name, t3.value as Test1 from Demographic t2 left join [region 2 section] as t3 on t1.id=t3.id where t2.id=1

Figure 8A:
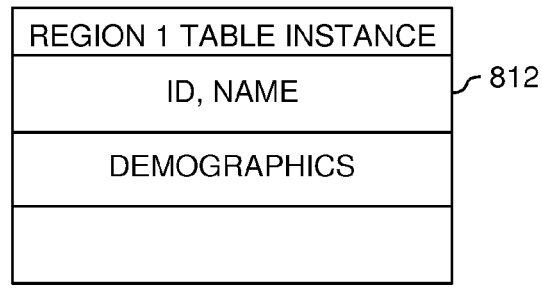
FIGS. 8A-8D illustrates the construction of an abstract query plan and corresponding abstract query generated according to the methods of FIG. 5, FIG. 6, and FIG. 9.

The only underlying physical table referenced in <region 1> is the demographics table. Thus, the only table instance required for this region is a table instance for the demographics table. FIG. 8A illustrates a table instance 810 corresponding to the demographics table referenced in <region 1> of the physical query. The ID and name columns referenced by the <region 1> portion of the query are placed in the fields/columns section 812. This particular sub query does not specify any conditions on the data that is selected from the demographics table. Thus, no conditions are added to the condition section 816 of the <region 1> table instance.

Figure 8B:
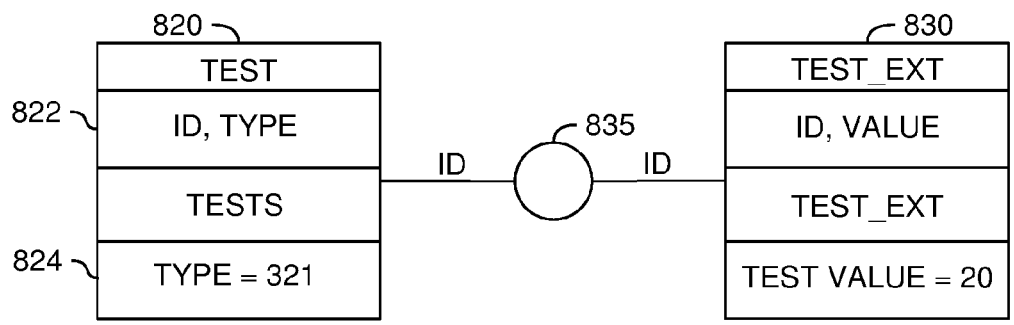

FIG. 8B illustrates an abstract query plan fragment created from <region 2> The <region 2> sub query of the physical query provides:

select*from test, test_ext where type=123 and test.testid=test_ext.testid where value=20

This sub-query region references two tables in the underlying database. Thus, two table instances 820 and 830 are generated. Table instance 820 corresponds to the Tests table. The "type=321" condition 824 from the <region 2> sub query is placed in table instance 820, as the "type" column exists in the Tests table. Fields/Column section 822 includes the ID and Type columns from which data is retrieved by the physical query. Table instance 830 corresponds to the tests_ext table and includes the "value=20" condition from the <region 2> sub query.

When an abstract query plan fragment includes more than one table instance, the fragment specifies how to join the table instances together using relationships specified by the underlying physical query. The <region 2> portion of the physical query includes the expression "test.testid=test_ext.testid." This expression relates data from the "test" table with data in the "test_ext" table using the "testid" column. Accordingly, join edge 835 indicates that data from the table instances 820 and 830 are joined using the data from the "testid" column. Additionally, a join edge between two table instances may indicate whether data from the underling tables is related in a one-to-one or one-to many fashion using relationships identified by the database abstraction model (e.g., relationship metadata illustrated in FIG. 4). Join edge 835 indicates a one-to-one relationship between table instances 820 and 830 (based on relationship metadata 804) by using a single line segment to connect the table instances.

A join edge may also indicate how data between the underlying tables is joined in the physical query. For example, data from one relational table may be joined to another table by specifying a sub select within an SQL query. The <region 2> portion of the example query illustrates such a sub select statement. Depending on the method used by the underlying physical query, a join edge may also indicate that data from the table instances should be joined via an inner, outer, left, or right join.

Figure 8C:
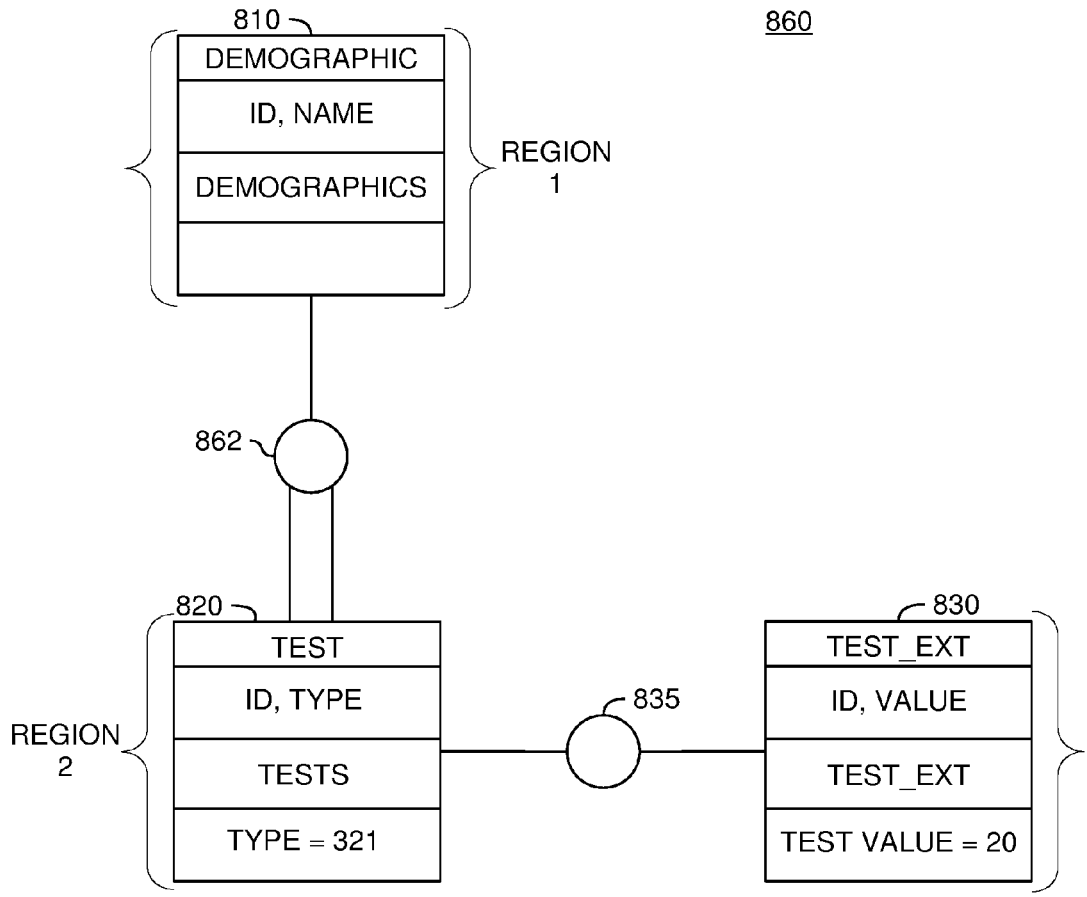

Returning to the method illustrated in FIG. 6, once step 606 is completed, an abstract query plan fragment has been created for each query region identified at step 604. At step 608, the fragments are joined together. FIG. 8C illustrates the query fragments from <region 1> and <region 2> joined to form abstract query plan 860. FIG. 8C illustrates <region 1> and <region 2> query plans joined using join edge 862. Tables instances in abstract query plan fragments are joined in the same manner as join edge 835 is used to join table instances 820 and 830 illustrated in FIG. 8B.

As illustrated, join edge 862 indicates a one-to-many relationship between table instance 810 and table instance 820 by the double line segment. The one-to-many relationship between table instance 810 and 820 is identified by the relationships metadata included in the database abstraction model 148 (i.e., relationship 406 illustrated in FIG. 4).

The abstract query plan fragment that includes data related to the model entity for the abstract query being constructed is placed at the root of the abstract query plan. In this case, the abstract query retrieves test data about patients. Thus, the query focus is the "patients" model entity. Instances of the patient model entity are identified using the "ID" column from the demographics table of database $214_2$. In one embodiment, a user specifies the model entity for the abstract query created from the physical query. Alternatively, the system may compare the columns for each table instance with model entity definitions to determine a model entity for the query. After all of the abstract query plan fragments are joined together, the abstract query plan includes all of the information related to the physical query. Next, information related to logical fields that correspond with the physical query information is identified and used to generate an abstract query.

Reverse Query Processing: Generating an Abstract Query

Figure 9:
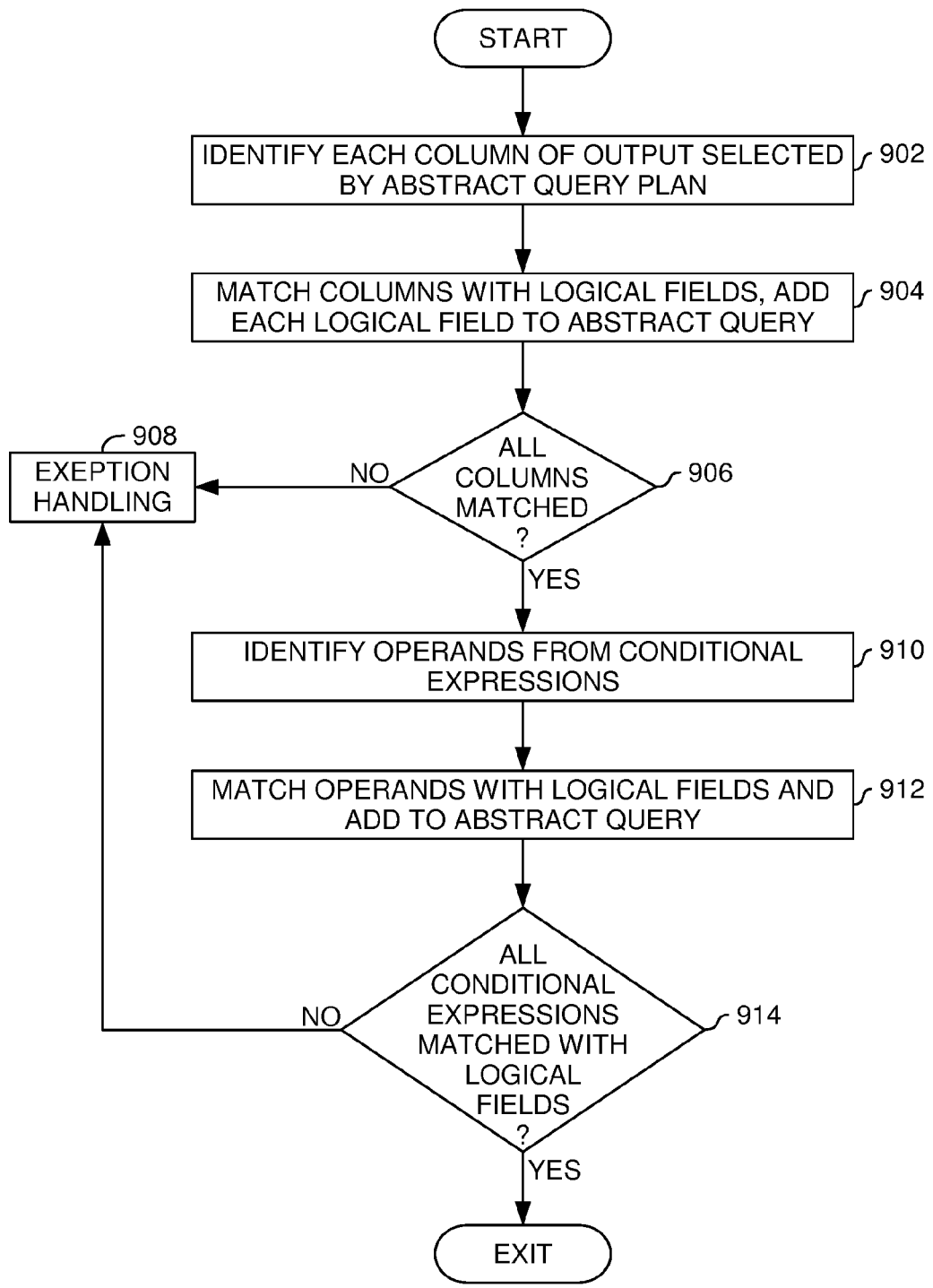
FIG. 9 illustrates a method for generating an abstract query from an abstract query plan, further illustrating the method of FIG. 6, according to one embodiment of the invention.

FIG. 9 illustrates a method 900 for generating an abstract query from an abstract query plan, further illustrating step 506 of method 500, according to one embodiment of the invention. Each table instance of the abstract query plan identifies a data source from the underlying database (e.g., a table) and what data sets from the data source are used by the table instance (e.g., columns). Data may be used as part of a condition, selected for output, or both. At step 902, the columns of output for the table instances are identified. These columns are then compared to logical fields defined by the data abstraction model. At step 904, logical fields that map to the same column identified in a table instance are included in the abstract query generated from the abstract query plan.

For example, abstract query plan 860 includes the "ID" column in the demographic table instance 810 and the "test value" column in the test_ext table instance 830. Accordingly, the corresponding logical fields "ID" $208_2$ and "hemoglobin test" $208_3$ are added to the abstract query 865. In this example, the tests table of database $214_2$ may be used to store the results for many different types of tests, and a different logical field may be defined for each different test type. Thus, multiple logical fields may map to the same column. The "hemoglobin_test" logical field is selected by comparing the conditions of the test table instance 820 with the filters specified by logical fields available in the database abstraction model 148. A match between the column mapped to by a logical field (in this case, test value) and a condition specified in the abstract query plan (test type=123) indicates which logical field should be selected for the abstract query being generated.

Next, at step 906 the method 900 queries whether any columns listed in the column section of a table instance were not matched to a logical field at step 904. If so, an exception condition occurs at step 908. This occurs if a given column of a table instance has no corresponding logical field in the data abstraction model. In one embodiment, the method 900 may cease and the runtime component 114 may indicate to a user that it was unable to generate an abstract query for the physical query provided. Alternatively, a new logical field may be defined to map to the column. In one embodiment, exception handling may be postponed until the end of method 900, or the method may continue and create a partial abstract query corresponding to the physical query. In such an embodiment, once the partial abstract query is completed, a user may review the partial abstract query, along with portions of the physical query that could not be transformed.

Otherwise, method 900 proceeds to step 910 and continues to generate an abstract query from the abstract query plan. At step 910, the method 900 identifies the operands referenced by the condition sections of the table instances in the abstract query plan. For example, the example SQL query includes the condition "test type=123" corresponding to the "hemoglobin test" logical field. At step 912, a condition section for the abstract query is generated. Logical fields are matched to the conditions include in table instances in the abstract query plan. Matching logical fields are added to the selection criteria of the abstract query, along with the conditional value specified by a condition. At step 914, the method queries whether any conditions were not matched to a logical field, if so the method proceeds to step 908 and exception handling occurs as described above. After both the conditions and results sections are completed, the abstract query is complete and may be returned to the user.

Figure 8D:
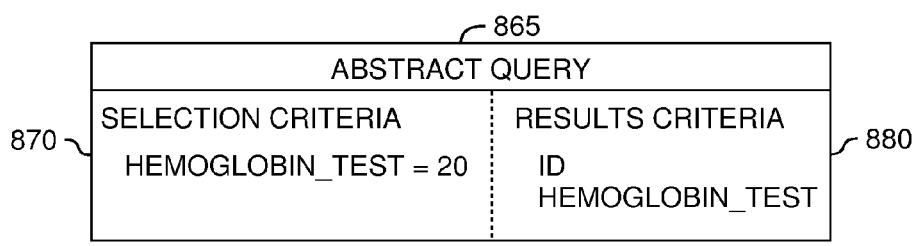

FIG. 8D illustrates the completed abstract query 865 generated from the abstract query plan 860. Results criteria 870 are added to the abstract query at step 904 of method 900. Selection criteria 880 are added as part of step 912 of method 900. As illustrated, the abstract query includes the "hemoglobin test>20" condition, and results section includes the "ID" and "hemoglobin test" logical field.

CONCLUSION

After processing a physical query, like the one first illustrated in Table I, above, a corresponding abstract query has been generated. Embodiments of the invention provide users of an abstract database the opportunity to reuse physical queries that may have been developed over years of experience working with a particular database or query language. Once converted to an abstract query, users may use the new abstract query with the abstract database environment. For example, because the database abstraction model provides an intuitive interface to compose queries and view query results, users may use the transformed physical query as a starting point to compose new abstract queries. Further, because the abstract database may provide additional functionality not available in the underlying physical databases, these features may now be applied to the abstract query generated from the query of the underlying physical database.

While the foregoing is directed to embodiments of the present invention, other and further embodiments of the invention may be devised without departing from the basic scope thereof, and the scope thereof is determined by the claims that follow.

What is claimed is:

1. A computer-readable storage medium containing a program which, when executed, performs operations, comprising:

receiving, from a requesting entity, a physical query composed in a query language used to query a physical database;

generating, from the physical query, an intermediate representation of the physical query that indicates (i) data sources within the physical database containing data queried by the physical query, (ii) any conditions specified by the physical query on the data queried and (iii) relationships between the data sources queried by the physical query; and generating, from the intermediate representation, an abstract query composed from a plurality of logical fields, wherein each logical field specifies (i) a name used to identify the logical field, and (ii) a reference to an access method selected from at least two different access method types, wherein each of the different access methods types defines a different manner of exposing the data corresponding to the name of the logical field.

2. The computer-readable storage medium of claim 1, further comprising, returning the abstract query to the requesting entity, and providing an indication of whether any data source queried by the physical query could not be used to generate a corresponding portion of the abstract query.

3. The computer-readable storage medium of claim 1, wherein the physical query comprises an SQL statement and the physical database comprises a relational database, and wherein the relationships between data sources are indicated by a relational schema of the relational database, and wherein each data source comprises a relational table.

4. The computer-readable storage medium of claim 1, wherein generating an intermediate representation of the physical query, comprises:
    resolving any indirect references to the physical database included in the physical query;
    dividing the physical query into a set of regions, and for each region creating an abstract query plan fragment corresponding to the region, wherein each abstract query plan fragment includes a set of one or more table instances, wherein each table instance includes:
        (i) a table from the physical database, wherein the table is referenced by the corresponding region of the physical query;
        (ii) an indication of the columns, in the table, that are referenced by the corresponding region of the physical query; and
        (iii) any conditions specified by the physical query that are applied against the tables and columns for the corresponding region; and
    joining the created abstract query plan fragments together to form an abstract query plan, wherein the fragments are joined according to relationships between tables in the physical database.

5. The computer-readable storage medium of claim 4, wherein an indirect reference comprises one of a view, common table expression, or temporary relational table.

6. The computer-readable storage medium of claim 4, wherein each region of the physical query is identified by an SQL select statement sub query within the physical query.

7. The computer-readable storage medium of claim 4, wherein generating an abstract query comprises:
    identifying each table in the abstract query plan that includes at least one of (i) an output column of data in the physical database selected for output and (ii) a column of data specified in a condition included in the abstract query plan;
    matching the at least one column of data to a logical field with an access method that maps the logical field to the at least one column of data and including the matching logical field in a results section of the abstract query; and
    identifying each condition in the abstract query plan evaluated in reference to a column in the physical database, and (i) matching the column with the access method provided for a logical field that maps to the column and (ii) including the logical field in a condition section of the abstract query.

8. A system, comprising at least one processor, for processing queries, and further comprising:
    a database abstraction model that provides a set of logical fields used to compose an abstract query, wherein each logical field specifies (i) an access method that maps the logical field to data in an underlying physical database;
    a runtime component, which when executed by the one or more processors is, configured to receive:
        a physical query having a format that is executable by a query engine to access the underlying physical database; and
        in response to the physical query, to generate, from the physical query, an intermediate representation of the physical query that indicates (i) data sources within the physical database containing data queried by the physical query, (ii) conditions specified by the physical query on the data queried and (iii) the relationships between the data sources queried by the physical query; and
    generating, from the intermediate representation, an abstract query composed from a plurality of logical fields, wherein each logical field specifies (i) a name used to identify the logical field, and (ii) a reference to an access method selected from at least two different access method types, wherein each of the different access methods types defines a different manner of exposing the data corresponding to the name of the logical field.

9. The system of claim 8, wherein the physical query comprises an SQL statement and the underlying physical database comprises a relational database, wherein the relationships between data sources are indicated by a relational schema of the relational database.

10. The system of claim 8, wherein the runtime is further configure to provide an indication to a requesting entity submitting the physical query whether any data source queried by the physical query could not be used to generate a corresponding portion of the abstract query.

11. The system of claim 8, wherein generating an intermediate representation of the physical query, comprises:
    resolving any indirect references to the physical database included in the physical query;
    dividing the physical query into a set of regions, and for each region creating an abstract query plan fragment corresponding to the region, wherein each abstract query plan fragment includes a set of one or more table instances, wherein each table instance includes:
        (i) a table from the physical database, wherein the table is referenced by the corresponding region of the physical query;
        (ii) an indication of the columns, in the table, that are referenced by the corresponding region of the physical query; and
        (iii) any conditions specified by the physical query that are applied against the tables and columns for the corresponding region; and
    joining the created abstract query plan fragments together to form an abstract query plan, wherein the fragments are joined according to relationships between tables in the physical database.

12. The system of claim 11, wherein an indirect reference comprises one of a view, common table expression, or temporary relational table.

13. The system of claim 11, wherein each region of the physical query is identified by an SQL select statement sub query within the physical query.

14. The system of claim 11, wherein generating, from the intermediate representation, an abstract query, comprises:
- identifying each table in the abstract query plan that includes at least one of (i) an output column of data in the physical database selected for output and (ii) a column of data specified in a condition included in the abstract query plan;
- matching the at least one column of data to a logical field with an access method that maps the logical field to the at least one column of data and including the matching logical field in a results section of the abstract query; and
- identifying each condition in the abstract query plan evaluated in reference to a column in the physical database, and (i) matching the column with the access method provided for a logical field that maps to the column and (ii) including the logical field in a condition section of the abstract query.

15. A method of generating an abstract query from a physical query, comprising:
- receiving, from a requesting entity, a physical query composed in a query language used to query a physical database;
- generating, from the physical query, an intermediate representation of the physical query that indicates (i) data sources within the physical database containing data queried by the physical query, (ii) conditions specified by the physical query on the data queried and (iii) relationships between the data sources queried by the physical query; and
- generating, from the intermediate representation, an abstract query composed from a plurality of logical fields, wherein each logical field specifies (i) a name used to identify the logical field, and (ii) an access method that maps the logical field to data in the physical database.

16. The method of claim 15, further comprising, returning the abstract query to the requesting entity, and providing an indication of whether any data source queried by the physical query could not be used to generate a corresponding portion of the abstract query.

17. The method of claim 15, wherein the physical query comprises an SQL statement and the physical database comprises a relational database; and wherein the relationships between data sources are indicated by a relational schema of the relational database, and wherein each data source comprises a relational table 18. The method of claim 15, wherein generating the intermediate representation of the physical query, comprises:
- resolving any indirect references to the physical database included in the physical query;
- dividing the physical query into a set of regions; and for each region,
- creating an abstract query plan fragment corresponding to the region, wherein each abstract query plan fragment includes a set of one or more table instances, wherein each table instance includes:
  (i) a table from the physical database, wherein the table is referenced by the corresponding region of the physical query;
  (ii) an indication of the columns, in the table, that are referenced by the corresponding region of the physical query; and
  (iii) any conditions specified by the physical query that are applied against the tables and columns for the corresponding region; and
- joining the created abstract query plan fragments together to form an abstract query plan, wherein the fragments are joined according to relationships between tables in the physical database.

19. The method of claim 18, wherein an indirect reference comprises one of a view, common table expression, or temporary relational table.

20. The method of claim 18, wherein generating the abstract query, comprises:
- identifying each table in the abstract query plan that includes at least one of (i) an output column of data in the physical database selected for output and (ii) a column of data specified in a condition included in the abstract query plan;
- matching the at least one column of data to a logical field with an access method that maps the logical field to the at least one column of data;
- including the matching logical field in a results section of the abstract query; and
- identifying each condition in the abstract query plan evaluated in reference to a column in the physical database, and (i) matching the column with the access method provided for a logical field that maps to the column and (ii) including the logical field in a condition section of the abstract query.

* * * * *